(12) United States Patent
Yamamoto

(10) Patent No.: US 11,656,808 B2
(45) Date of Patent: May 23, 2023

(54) INFORMATION PROCESSING APPARATUS, INFORMATION PROCESSING SYSTEM, AND INFORMATION PROCESSING METHOD

(71) Applicant: SHARP KABUSHIKI KAISHA, Sakai (JP)

(72) Inventor: Toshio Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/726,301

(22) Filed: Apr. 21, 2022

(65) Prior Publication Data
US 2022/0342613 A1  Oct. 27, 2022

(30) Foreign Application Priority Data
Apr. 27, 2021 (JP) .............................. JP2021-074778

(51) Int. Cl.
*G06F 3/12* (2006.01)

(52) U.S. Cl.
CPC ............ *G06F 3/1204* (2013.01); *G06F 3/126* (2013.01); *G06F 3/1236* (2013.01); *G06F 3/1253* (2013.01); *G06F 3/1285* (2013.01)

(58) Field of Classification Search
CPC .... G06F 3/1204; G06F 3/1236; G06F 3/1253; G06F 3/126; G06F 3/1285
USPC ....................................................... 358/1.15
See application file for complete search history.

(56) References Cited

U.S. PATENT DOCUMENTS

| 2008/0192289 | A1* | 8/2008 | Honda | G06F 3/1238 |
| | | | | 358/1.15 |
| 2017/0289392 | A1* | 10/2017 | Hwang | G06F 3/1267 |

FOREIGN PATENT DOCUMENTS

JP  2016-027447 A  2/2016

* cited by examiner

*Primary Examiner* — Allen H Nguyen
(74) *Attorney, Agent, or Firm* — ScienBiziP, P.C.

(57) ABSTRACT

An information processing apparatus includes a presentation determination processor that presents selection information for causing a user to select an image-forming apparatus for executing printing and a distance determination processor that measures, when a first image-forming apparatus is selected in the selection information, a distance of the first image-forming apparatus from an installation position and determines whether the measured distance is equal to or larger than a predetermined distance. When determining that the distance is equal to or larger than the predetermined distance, the presentation determination processor performs a presenting process of presenting confirmation information for confirming whether the image-forming apparatus for executing printing is to be switched from the first image-forming apparatus.

10 Claims, 11 Drawing Sheets

| PRINTER NAME | INSTALLATION LOCATION | USAGE |
|---|---|---|
| FIRST IMAGE-FORMING APPARATUS | 123 XX AA-CITY BB-PREFECTURE | COMPANY USE |
| SECOND IMAGE-FORMING APPARATUS | — | HOME USE |

INFORMATION PROCESSING APPARATUS, INFORMATION PROCESSING SYSTEM, AND INFORMATION PROCESSING METHOD

CROSS-REFERENCE TO RELATED APPLICATIONS

This application claims the benefit of priority to Japanese Patent Application Number 2021-074778 filed on Apr. 27, 2021. The entire contents of the above-identified application are hereby incorporated by reference.

BACKGROUND OF THE INVENTION

Field of the Invention

The present disclosure relates to an information processing apparatus, an information processing system, and an information processing method.

Description of the Background Art

Japanese Unexamined Patent Application Publication No. 2016-27447 discloses a system in which a manager or the like checks handling of information in an information processing apparatus used by a telecommuter in a remote environment, such as telework represented by telecommuting.

In many cases, a printer installed in a company is selected as a default printer on a printer selection screen at a time of print settings in the information processing apparatus normally used in the company. In this case, when the user is working at home, such as during telework, and uses the information processing apparatus to perform printing, the user may accidentally select the printer installed in the company that is far away from a user's location, which is selected by default, instead of a nearby printer installed at home. The present disclosure is to provide an information processing apparatus, an information processing system, and an information processing method that avoid unrequired printing unintentionally performed by the user.

SUMMARY OF THE INVENTION

According to an aspect of the present disclosure, an information processing apparatus includes a presentation determination processor that presents selection information for causing a user to select an image-forming apparatus for executing printing and a distance determination processor that measures, when a first image-forming apparatus is selected in the selection information, a distance of the first image-forming apparatus from an installation position and determines whether the measured distance is equal to or larger than a predetermined distance. When determining that the distance is equal to or larger than the predetermined distance, the presentation determination processor performs a presenting process of presenting confirmation information for confirming whether the image-forming apparatus for executing printing is to be switched from the first image-forming apparatus.

According to another aspect of the present disclosure, an information processing method includes presenting selection information for causing a user to select an image-forming apparatus for executing printing and measuring, when a first image-forming apparatus is selected in the selection information, a distance of the first image-forming apparatus from an installation position and determining whether the measured distance is equal to or larger than a predetermined distance. When it is determined that the distance is equal to or larger than the predetermined distance, a presenting process of presenting confirmation information for confirming whether the image-forming apparatus for executing printing is to be switched from the first image-forming apparatus.

According to the information processing apparatus, the information processing system, and the information processing method, unrequired printing unintentionally performed by the user may be avoided.

DESCRIPTION OF THE PREFERRED EMBODIMENTS

Embodiment

Figure 1:
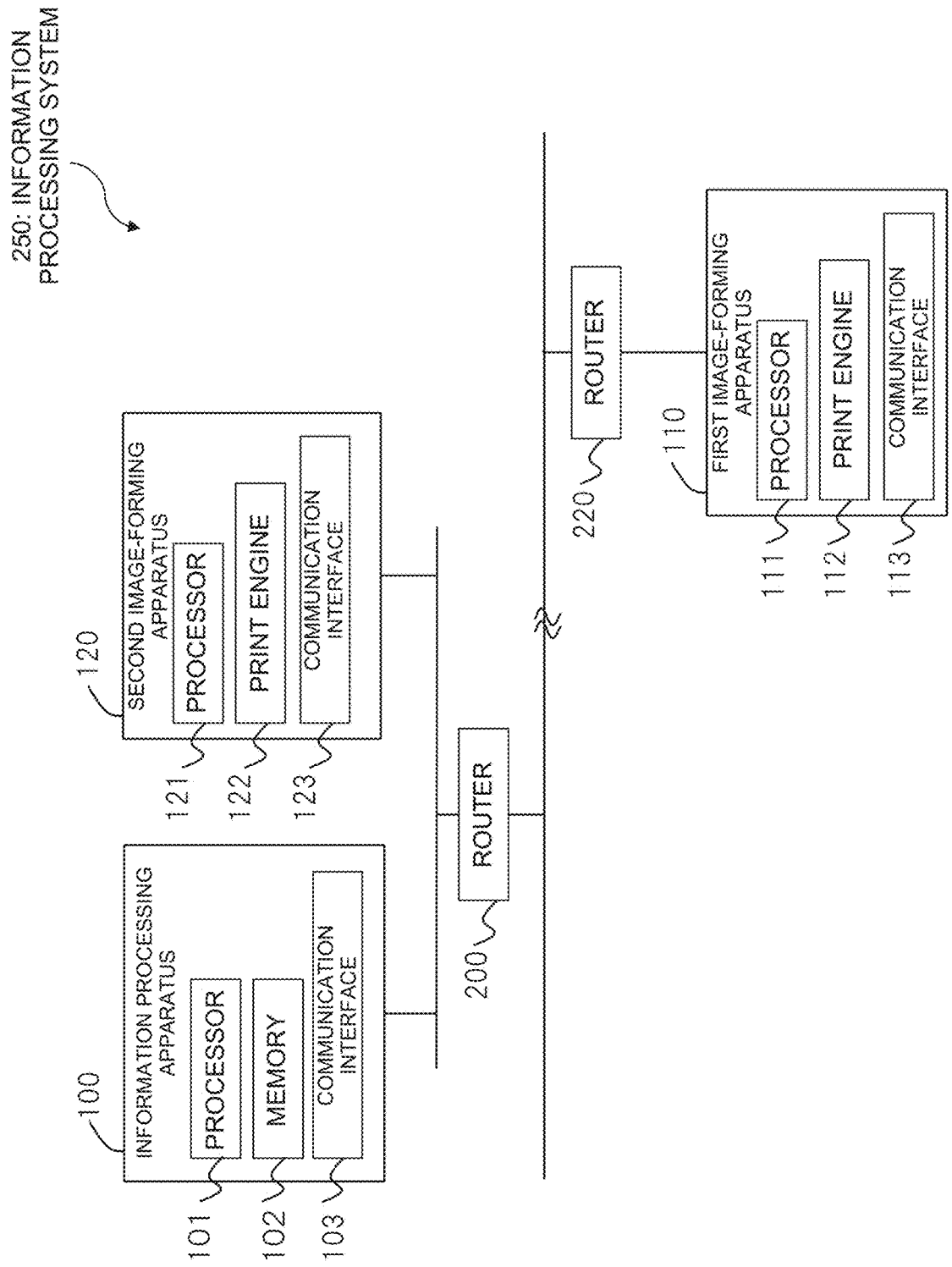
FIG. 1 is a diagram illustrating a configuration of an information processing system according to an embodiment.

Hereinafter, an embodiment will be described with reference to the accompanying drawings. For the drawings, the same reference numerals are attached to the same or equivalent elements, and duplicate explanations will be omitted.

The embodiment described below does not unreasonably limit the scope of the claims. In addition, it is not necessarily the case that all components described in this embodiment are requirements of the present disclosure.

FIG. 1 is a diagram illustrating a configuration of an information processing system 250 according to the embodiment. For example, the information processing system 250 includes an information processing apparatus 100, a first image-forming apparatus (image-forming apparatus) 110, and a second image-forming apparatus (image-forming apparatus) 120. In FIG. 1, as an example, the information processing system 250 provided assuming that a user uses the information processing apparatus 100, that is usually used in an office, at home for telework or the like is illustrated. The second image-forming apparatus 120 may be omitted in the information processing system 250.

The information processing apparatus 100 is a terminal device used by a user. The information processing apparatus 100 is connected to a router 200 and is connected to the Internet via the router 200, for example. The information processing apparatus 100 is, for example, a PC (Personal Computer). The information processing apparatus 100 is capable of instructing the first image-forming apparatus 110 and the second image-forming apparatus 120 to execute printing using printer drivers, and is not limited to a PC. For example, the information processing apparatus 100 may be a smartphone, a tablet terminal, a wearable device, or a like device.

The information processing apparatus 100 includes a processor 101, a memory 102, and a communication interface 103. Note that, a hardware configuration of the information processing apparatus 100 is not limited to this, and various modifications may be made such that some of the components are omitted or other components are added. For example, the information processing apparatus 100 may include a display device or the like corresponding to a display 60 which will be described below with reference to FIG. 2.

The processor 101 may be constituted by one of various processors, such as a CPU (Central Processing Unit), a GPU (Graphics Processing Unit), a DSP (Digital Signal Processor), and an ASIC (Application Specific Integrated Circuit). Furthermore, the processor 101 may include a peripheral circuit device in addition to the CPU, the GPU, the DSP, or the like. The peripheral circuit device may be an IC (Integrated Circuit) or may include a resistor, a capacitor, and so on.

The memory 102 may be constituted by a semiconductor memory, such as an SRAM (Static Random Access Memory), a DRAM (Dynamic Random Access Memory), a ROM (Read Only Memory), a flash memory, or an SSD (Solid State Drive), a register, a magnetic storage device, such as an HDD (Hard Disk Drive), or an optical storage device, such as an optical disk device.

The communication interface 103 is used to perform communication with external apparatuses. For example, the communication interface 103 is used to perform communication through a network, and includes an antenna, an RF (Radio Frequency) circuit, and a baseband circuit. The communication interface 103 is used to perform communication based on IEEE 802.11, for example. However, the specific communication method may be modified in various ways. For example, the communication interface 103 may be used for wired communication, such as communication based on a USB (Universal Serial Bus) standard. The communication interface 103 is also used to perform positioning through GPS (Global Positioning System) and includes a GPS antenna and a GPS receiver circuit. The communication interface 103 may operate under control of the processor 101 or may include a processor for communication control that is different from the processor 101.

Each of the first image-forming apparatus 110 and the second image-forming apparatus 120 has a printing function. Each of the first image-forming apparatus 110 and the second image-forming apparatus 120 may be a printer, a printer with a scanning function, or an MFP (Multifunction Peripheral) having various functions including a printing function.

The first image-forming apparatus 110 is installed in a different location from a user's home, such as an office of a company where the user usually works. The first image-forming apparatus 110 is connected to a router 220 that is different from the router 200 connected to the information processing apparatus 100 and is connected to the Internet via the router 220, for example. In other words, the first image-forming apparatus 110 is connected to a different network from the information processing apparatus 100.

The second image-forming apparatus 120 is installed in a different location from the office of the company where the user usually works, such as the user's home. The second image-forming apparatus 120 is connected to the same router 200 as the information processing apparatus 100 used by the user and is connected to the Internet via the router 200, for example. In other words, the second image-forming apparatus 120 is connected to the same network as the information processing apparatus 100.

The individual locations of the first image-forming apparatus 110 and the second image-forming apparatus 120 described above are merely examples, and the first image-forming apparatus 110 and the second image-forming apparatus 120 may be installed in other locations.

The first image-forming apparatus 110 includes a processor 111, a print engine 112, and a communication interface 113. The second image-forming apparatus 120 includes a processor 121, a print engine 122, and a communication interface 123.

Each of the print engines 112 and 122 includes a mechanical configuration for performing printing on a print medium. For example, each of the print engines 112 and 122 includes a conveyance roller that conveys the print medium in a conveyance direction and a conveyance motor that drives the conveyance roller. In addition, when the first image-forming apparatus 110 and the second image-forming apparatus 120 are inkjet printers, each of the print engines 112 and 122 includes a carriage in which a print head is mounted and a carriage motor that drives the carriage in a main scanning direction orthogonal to the conveyance direction. Each of the print engines 112 and 122 forms an image on the print medium by ejecting ink from the print head that reciprocates in the main scanning direction while conveying the print medium in the conveyance direction. Note that various types of image-forming apparatus may be employed as the first image-forming apparatus 110 and the second image-forming apparatus 120 of this embodiment, and the configuration of each of the print engines 112 and 122 is not limited to this. For example, each of the first image-forming apparatus 110 and the second image-forming apparatus 120 may be a line head inkjet printer having a print head with a width corresponding to a width of the print medium. Furthermore, each of the first image-forming apparatus 110 and the second image-forming apparatus 120 may be an electrophotographic image-forming apparatus, such as a laser printer.

Each of the communication interfaces 113 and 123 communicates with the information processing apparatus 100. The communication interfaces 113 and 123 may perform communication based on the USB standard, the IEEE 802.11 standard, or other methods. Each of the communication interfaces 113 and 123 obtains a print job from the information processing apparatus 100. A print job is data used to execute printing in each of the first image-forming apparatus 110 and the second image-forming apparatus 120 as described below with reference to FIG. 6.

The processor 111 controls the print engine 112 to perform the printing operation according to the print job. Furthermore, the processor 121 controls the print engine 122 to perform the printing operation according to the print job. As each of the processors 111 and 121, various processors may be used including a CPU and a DSP. The processor 111 may include a main CPU that controls the entire first image-forming apparatus 110 and a sub-CPU that controls printing. The processor 121 may include a main CPU that controls the entire second image-forming apparatus 120 and a sub-CPU that controls printing.

Figures 2, 3:
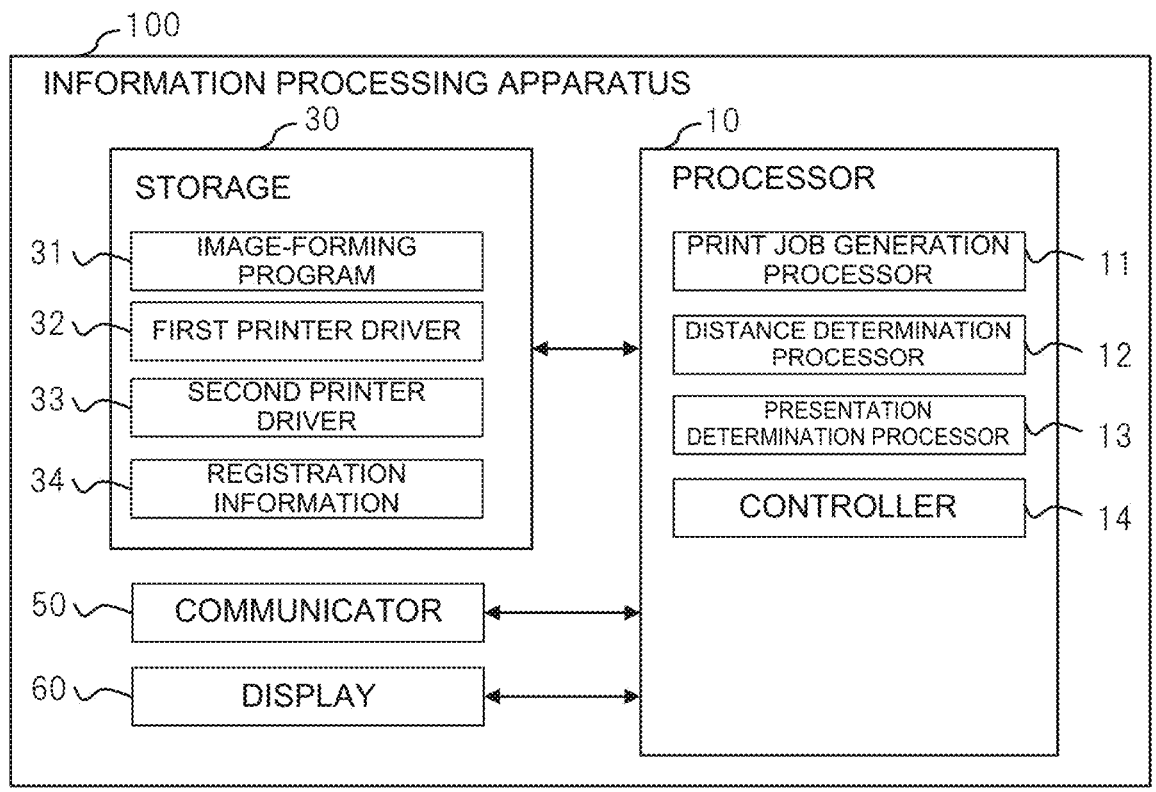
FIG. 2 is a diagram illustrating functional blocks of an information processing apparatus according to the embodiment.
FIG. 3 is a diagram illustrating an example of registration information stored in a storage according to the embodiment.

FIG. 2 is a diagram illustrating functional blocks of the information processing apparatus 100 according to the embodiment. The information processing apparatus 100 includes a processor 10, a storage 30, a communicator 50, and a display 60. The processor 10 corresponds to the processor 101 in FIG. 1. The storage 30 corresponds to the memory 102 in FIG. 1. The communicator 50 corresponds to the communication interface 103 in FIG. 1. Note that a configuration of the information processing apparatus 100 is not limited to that illustrated in FIG. 2, but may be modified by adding other components or omitting some components.

The processor 10 may include a print job generation processor 11, a distance determination processor 12, a presentation determination processor 13, and a controller 14. The storage 30 may store an image-forming program 31, a first printer driver 32, a second printer driver 33, and registration information 34. Furthermore, the storage 30 may also store software, such as a map application capable of measuring distances using location information obtained from GPS, a message application capable of sending messages to others including e-mails, and a calendar application capable of registering and managing schedules.

The processor 10 includes hardware that includes at least one of a circuit for processing digital signals and a circuit for processing analog signals. For example, the hardware may include one or more circuit devices implemented on a circuit substrate or one or more circuit elements. Examples of the one or more circuit devices include an IC and an FPGA (field-programmable gate array). Examples of the one or more circuit elements include a resistor and a capacitor.

The print job generation processor 11 generates a print job required for performing printing based on the image-forming program 31 using the first image-forming apparatus 110 or the second image-forming apparatus 120. In addition, as will be described in detail below with reference to FIG. 10 and the other drawings, the print job generation processor 11 stores data indicating print hold in the print job when print hold confirmation information 551 is selected by the user on a printing method switching confirmation screen 550. Furthermore, the print job generation processor 11 stores, in password information 406 of the print job (refer to FIG. 6), a password as data input by the user after the printing method switching confirmation screen 550 (refer to FIG. 10) is presented by the presentation determination processor 13.

The distance determination processor 12 measures, based on the image-forming program 31, a distance from an installation position of an image-forming apparatus (the first image-forming apparatus 110, for example) whose installation position has been registered in advance in the registration information 34 to the information processing apparatus 100 and determines whether the measured distance is equal to or larger than a predetermined distance.

The presentation determination processor 13 displays, in the display 60, a print setting screen (print setting information), such as a selection screen (selection information), in which various settings required for execution of printing are set by the user, for example, based on the image-forming program 31 so as to present the print setting screen to the user. Furthermore, the presentation determination processor 13 displays various confirmation screens (confirmation information) on the display 60 based on the image-forming program 31 to present the various confirmation screens to the user, for example.

The selection screen (selection information) is information (screen) used by the user to select an image-forming apparatus for executing printing (which will be described below with reference to FIG. 4 and the other drawings). When the first image-forming apparatus 110 is selected on the selection screen and the distance determination processor 12 determines that a distance from the first image-forming apparatus 110 is equal to or larger than the predetermined distance, the presentation determination processor 13 performs a presenting process of presenting confirmation information (confirmation screen 500) for confirming to the user whether switching from the first image-forming apparatus 110 is to be performed for executing printing (which will be described hereinafter with reference to FIG. 9, FIG. 10, and the other drawings). Examples of the confirmation information (confirmation screen 500) presented to the user by the presentation determination processor 13 include a switching confirmation screen (switching confirmation information) 510 (refer to FIG. 9) and a printing method switching confirmation screen 550 (refer to FIG. 10).

The switching confirmation screen (switching confirmation information) 510 is used to confirm whether to switch an image-forming apparatus to be used for printing from the first image-forming apparatus 110 to the second image-forming apparatus 120. When the user selects, through the switching confirmation screen (switching confirmation information) 510, switching of the image-forming apparatus to be used for executing printing from the first image-forming apparatus 110 to the second image-forming apparatus 120, the presentation determination processor 13 executes the process of switching the image-forming apparatus to be used for executing printing from the first image-forming apparatus 110 to the second image-forming apparatus 120 (details will be described below with reference to FIG. 9 and the other drawings).

The printing method switching confirmation screen 550 (refer to FIG. 10) includes at least one information item for confirming whether a printing method is to be switched. The presentation determination processor 13 executes a process according to the printing method selected by the user through the printing method switching confirmation screen 550.

Specifically, for example, the printing method switching confirmation screen 550 may include at least one of print hold confirmation information 551 to confirm whether to perform print hold, request printing confirmation information 552 to confirm whether to perform request printing, network printing confirmation information 553 to confirm whether to perform network printing, and calendar registration confirmation information 554 to confirm whether to perform calendar registration.

When the user selects the print hold confirmation information 551 through the printing method switching confirmation screen 550, the presentation determination processor 13 executes a process for performing the print hold (details will be described below with reference to FIG. 10 and the other drawings). When the user selects the request printing confirmation information 552 through the printing method switching confirmation screen 550, the presentation determination processor 13 executes a process for performing the request printing (details will be described below with reference to FIG. 11 and the other drawings). When the user selects the network printing confirmation information 553 through the printing method switching confirmation screen 550, the presentation determination processor 13 executes a process for performing the network printing (details will be described below with reference to FIG. 12, FIG. 13, and the other drawings). When the user selects the calendar registration confirmation information 554 through the printing method switching confirmation screen 550, the presentation determination processor 13 executes a process for performing the calendar registration (details will be described below with reference to FIG. 14 and the other drawings).

The controller 14 controls the individual sections in the information processing apparatus 100. For example, the controller 14 performs read/write control of the storage 30, communication control of the communicator 50, and so on.

The storage 30 (memory 102) stores computer readable instructions, and when the processor 10 (processor 101) executes the instructions, functions of the processor 10 are realized as processes. Specifically, the processor 101 operates, in accordance with the instructions stored in the memory 102, to execute the processes of the print job generation processor 11, the distance determination processor 12, the presentation determination processor 13, and the controller 14. Examples of the instructions herein may be instructions of an instruction set constituting a program or an instruction that instructs a hardware circuit of the processor 101 to operate.

The image-forming program 31 has a function of causing the processor 10 to execute various processes. For example, the image-forming program 31 realizes functions of the print job generation processor 11, the distance determination processor 12, the presentation determination processor 13, and the controller 14.

The first printer driver 32 has functions required for the first image-forming apparatus 110 to perform printing. The second printer driver 33 has functions required for the second image-forming apparatus 120 to perform printing.

The registration information 34 is data in which an installation location of an image-forming apparatus corresponding to an installed printer driver is registered in advance. The registration information 34 may be associated with usage (for example, company use, home use, or the like) of each image-forming apparatus corresponding to an installed printer driver. Details of the registration information 34 will be described hereinafter with reference to FIG. 3.

The print job generation processor 11 that executes the image-forming program 31 generates, when the first image-forming apparatus 110 is selected on the selection screen (selection information), a print job required for causing the first image-forming apparatus 110 to execute printing based on the first printer driver 32. Furthermore, the print job generation processor 11 that executes the image-forming program 31 generates, when the second image-forming apparatus 120 is selected on the selection screen (selection information), a print job required for causing the second image-forming apparatus 120 to execute printing based on the second printer driver 33.

The storage 30 may also store an operating system (OS), not illustrated, and application software operating on the OS. The controller 14 is realized when the processor 10 operates in accordance with the OS or the like.

Furthermore, the program that realizes the processes performed by the individual sections in the processor 10 of this embodiment may be stored in a non-transitory information storage device (information storage medium) which is a computer-readable medium, for example. The information storage device may be realized by an optical disk, a memory card, an HDD, or a semiconductor memory, for example. The semiconductor memory is, for example, a ROM. The processor 10 performs the various processes of this embodiment based on the programs stored in the information storage device. In other words, the information storage device stores a program for causing the computer to function as the individual sections of the processor 10. The computer is an apparatus including an input device, a processor, a storage, and an output section. Specifically, the program according to this embodiment causes the computer to execute individual steps described below with reference to FIG. 8, FIG. 15, and the other drawings, and specifically, is the image-forming program 31.

The communicator 50 is used for communication between the information processing apparatus 100 and an external apparatus. For example, the communicator 50 performs, based on instructions issued by the processor 10 operating in accordance with the image-forming program 31, transmission and reception of information with the first image-forming apparatus 110 or the second image-forming apparatus 120, or reception of data indicating a current position of the information processing apparatus 100 from GPS. Furthermore, the communicator 50 transmits a print job that is data for executing printing to the first image-forming apparatus 110 or the second image-forming apparatus 120, for example.

The display 60 is used to display various display screens, and may be realized by, for example, a liquid crystal display or an organic EL (electroluminescence) display.

FIG. 3 is a diagram illustrating an example of the registration information 34 stored in the storage 30 according to the embodiment. In the registration information 34, identification information for identifying an image-forming apparatus and information indicating an installation location of the image-forming apparatus may be registered in association with each other for each printer driver installed in the information processing apparatus 100.

For example, in the example illustrated in FIG. 3, the registration information 34 includes identification information that identifies the first image-forming apparatus 110 and information indicating an installation location where the first image-forming apparatus 110 is actually installed that are registered in association with each other. In the example illustrated in FIG. 3, the registration information 34 includes a printer name "first image-forming apparatus" that is an example of identification information of the first image-forming apparatus 110 and an address of an installation location of the first image-forming apparatus 110 which is an example of information indicating the installation location of the first image-forming apparatus 110 that are registered in association with each other.

Furthermore, in the example illustrated in FIG. 3, a printer name "second image-forming apparatus" that is an example of identification information of the second image-forming apparatus 120 is not associated with information indicating an installation location (an address of an installation location, for example) of the second image-forming apparatus 120.

Note that, as the installation location of the image-forming apparatus registered in the registration information 34, an address or the like may be input by the user or a position on map data obtained when a map application is activated using positional information obtained from GPS may be registered.

Moreover, in the example illustrated in FIG. 3, in the registration information 34, a printer name "first image-forming apparatus" that is an example of the identification information of the first image-forming apparatus 110 and a usage "company use" that are associated with each other are registered, and a printer name "second image-forming apparatus" that is an example of the identification information of the second image-forming apparatus 120 and a usage "home use" that are associated with each other are registered.

Note that the installation locations and the usages may be arbitrarily registered in the registration information 34 by the user. Furthermore, although the printer name is taken as an example of the identification information for identifying each image-forming apparatus corresponding to an installed printer driver, the identification information is not limited to the printer name, but may be other information, such as an ID number associated with each printer.

Figure 4:
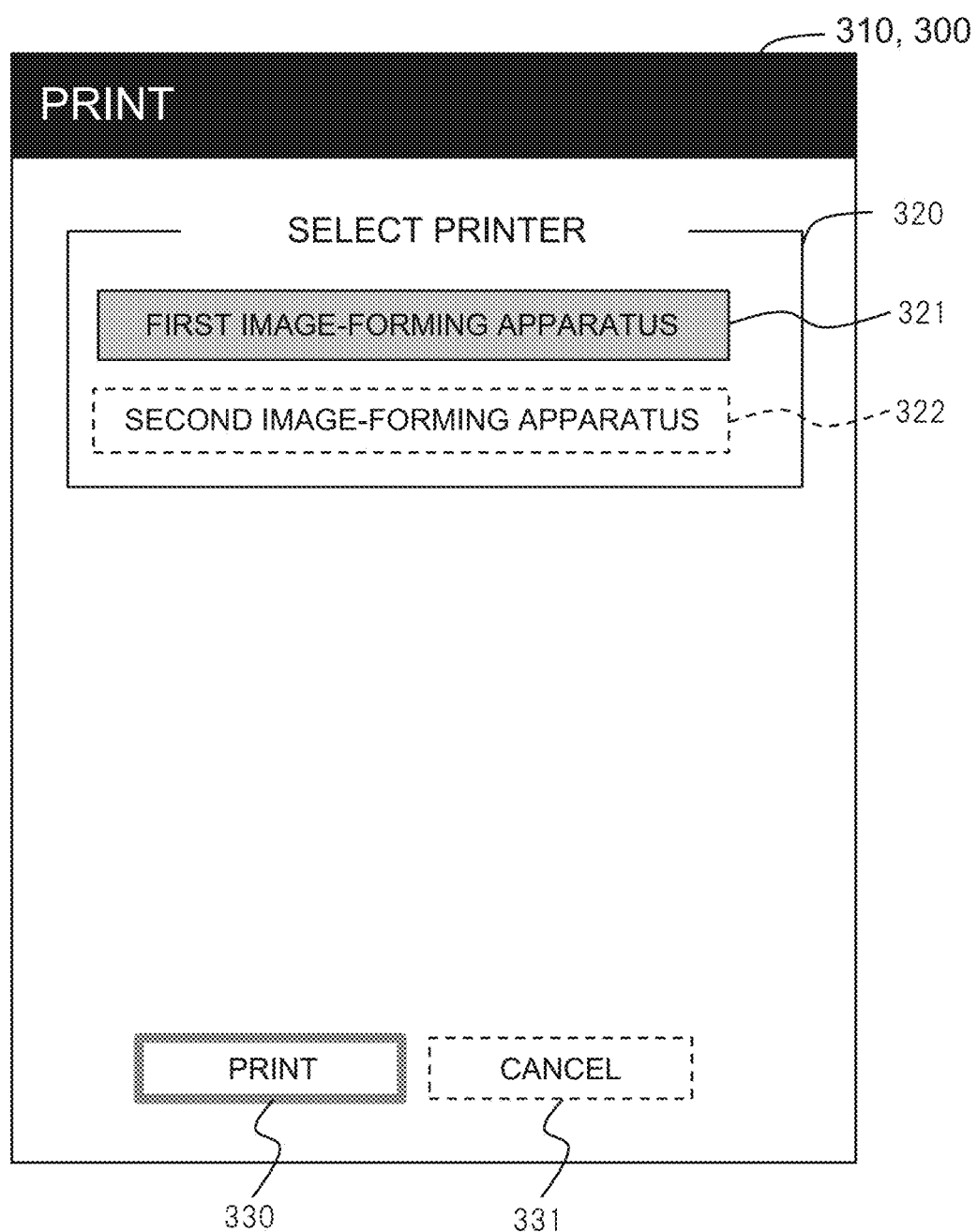
FIG. 4 is a diagram illustrating an example of a selection screen displayed on a display by a presentation determination processor.

FIG. 4 is a diagram illustrating an example of the selection screen (selection information) 310 displayed on the display 60 by the presentation determination processor 13. The selection screen 310 illustrated in FIG. 4, which is one of print setting screens 300 presented by the presentation determination processor 13 (displayed on the display 60), allows the user to select an image-forming apparatus for executing printing.

When a user of the information processing apparatus 100 issues an instruction for executing printing to the information processing apparatus 100, the processor 10 receives an input signal indicating the instruction and executes the image-forming program 31. Then, the presentation determination processor 13 displays, in the display 60, one of the print setting screens 300 that allows the user to input various print settings so as to display the print setting screen 300 for the user. Examples of the print setting screens 300 presented to the user (displayed on the display 60) by the presentation determination processor 13 include a UI (User Interface) screen.

The selection screen 310 includes, for example, a selection field 320 that allows the user to select an image-forming apparatus for executing printing from among image-forming apparatuses corresponding to printer drivers installed in the information processing apparatus 100, a print button 330 used to execute printing, and a cancel button 331 used to cancel the execution of printing.

For example, in the selection field 320, selection items 321 and 322 indicating the first and second image-forming apparatuses 110 and 120, respectively, corresponding to installed printer drivers are arranged in a selectable manner.

When the user selects the print button 330 in a state in which the selection item 321 indicating the first image-forming apparatus 110 or the selection item 322 indicating the second image-forming apparatus 120 is selected on the selection screen 310, the print job generation processor 11 generates a print job for causing the first image-forming apparatus 110 or the second image-forming apparatus 120 to execute printing.

A display format of the selection screen 310 illustrated in FIG. 4 is merely an example, and the selection items 321 and 322 may be displayed in a pull-down format or in other display formats. The display content of the selection screen 310 illustrated in FIG. 4 is also an example, and other selection items or the like may be displayed.

Furthermore, when the information processing apparatus 100 is usually used in an office of a company, for example, the selection item 321 indicating the first image-forming apparatus 110 that is instructed by the information processing apparatus 100 to perform printing may be selected by default, that is, the selection item 321 may be selected, before selection by the user, when the selection screen 310 is displayed in the display 60.

Figure 5:
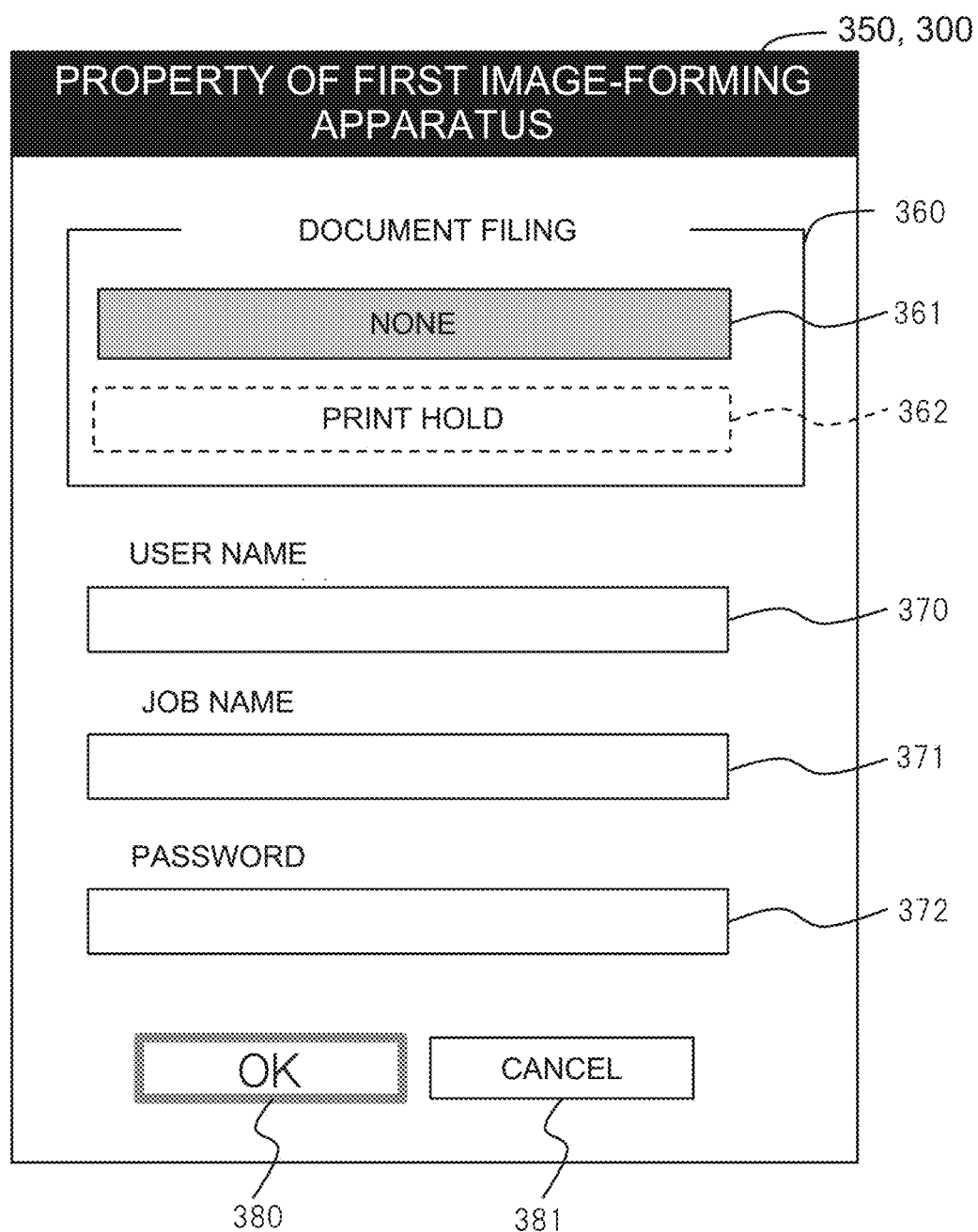
FIG. 5 is a diagram illustrating an example of a property setting screen displayed on the display by the presentation determination processor.

FIG. 5 is a diagram illustrating an example of a property setting screen 350 displayed on the display 60 by the presentation determination processor 13. For example, after the presentation determination processor 13 presents the selection screen 310 illustrated in FIG. 4 to the user, the presentation determination processor 13 may present the property setting screen (detailed setting screen) 350, that is one of the print setting screens 300, to the user by displaying the property setting screen 350 on the display 60. The property setting screen 350 allows the user to set various settings required for generation of a print job in the print setting screens 300 presented by the presentation determination processor 13 (displayed on the display 60).

For example, the property setting screen 350 includes a document filing setting field 360, a user name input field 370, a job name input field 371, a password input field 372, an OK button 380, and a cancel button 381.

The document filing setting field 360 is used to set, for example, whether to cause the image-forming apparatus to which a print job is transmitted to perform print hold. In the example illustrated in FIG. 5, selection items 361 and 362 are displayed in an arranged manner in the document filing setting field 360, for example.

Here, the print hold is a function of causing an image-forming apparatus to which a print job is transmitted to store the print job and suspend execution of printing. An image-forming apparatus to which a print job storing information about the print hold is transmitted stores the print job in a storage and holds off on execution of printing. Furthermore, the image-forming apparatus to which a print job having information indicating that the print hold is not to be performed added thereto is transmitted immediately executes printing based on the print job.

The selection item 361 is described as "None" and presents the user with an option to perform a function of no print hold, for example. In other words, the selection item 361 is used to cause the image-forming apparatus to which the print job is transmitted to select immediate execution of printing without performing the print hold. The selection item 362 includes a description "Print Hold", for example, and presents the user with an option to perform a function of print hold, for example. In other words, the selection item 362 is used to cause the image-forming apparatus to which the print job is transmitted to select print hold such that the print job is stored in the storage and execution of the printing is suspended.

The user name input field 370 is used to register a user name in the print job. The job name input field 371 is used to register a job name in the print job. The password input field 372 is used to register a password in the print job. Note that the password is required to be input, in the image-forming apparatus to which the print job is transmitted, when content of the print job that has been subjected to the print hold (stored in the storage) is displayed in the display of the image-forming apparatus or when the print job that has been subjected to the print hold (stored in the storage) is printed by the image-forming apparatus. Arbitrary content may be or may not be registered by the user as the user name, the job name, and the password.

The OK button 380 indicates that an input of the detailed property settings is complete. When the OK button 380 is selected by the user, the presentation determination processor 13 may display the selection screen 310 illustrated in FIG. 4 on the display 60 or the print job generation processor 11 may start generation of a print job. The cancel button 381 is used to cancel an input of the detailed property settings. When the cancel button 381 is selected by the user, the presentation determination processor 13 may display the selection screen 310 illustrated in FIG. 4 on the display 60 or terminates display of the various types of print setting screen 300 on the display 60.

A display format of the property setting screen 350 illustrated in FIG. 5 is merely an example, and the individual selection items in the document filing setting field 360 may be displayed in a pull-down format or in other display formats, for example. The display content of the property setting screen 350 illustrated in FIG. 5 is also an example, and other input fields or the like may be displayed. Furthermore, the property setting screen 350 may include different contents for different image-forming apparatuses selected on the selection screen 310.

Figure 6:
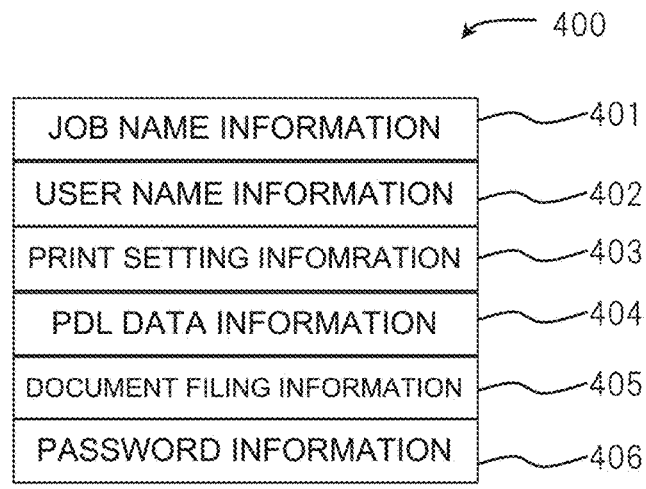
FIG. 6 is a diagram illustrating an example of a print job according to the embodiment.

FIG. 6 is a diagram illustrating an example of a print job 400 according to the embodiment. The print job 400 is generated, based on information input through the property setting screen 350 or the like, when the print job generation processor 11 executes the image-forming program 31.

For example, the print job 400 includes the following information as data: job name information 401 indicating a job name of the print job 400; user name information 402 indicating a name of a user who generated the print job 400, print setting information 403 indicating print settings, PDL (Page Description Language) data information 404, document filing information 405 indicating document filing, and password information 406 indicating a password.

The job name information 401 stores data indicating content input in the job name input field 371 of the property setting screen 350 (refer to FIG. 5). The user name information 402 stores data indicating content input in the user name input field 370 of the property setting screen 350 (refer to FIG. 5). The print setting information 403 stores data indicating various print settings (for example, the number of copies to be printed, a color mode setting, a single-sided and double-sided print setting, and so on) set via the print setting screen 300. The PDL data information 404 stores PDL data used for rendering. The document filing information 405 stores data for executing a function associated with a selection item selected in the document filing setting field 360 in the property setting screen 350 (refer to FIG. 5) (a function of not performing print hold associated with the selection item 361 or a function of performing print hold associated with the selection item 362). The password information 406 stores data indicating content input in the password input field 372 of the property setting screen 350 (refer to FIG. 5).

Figure 7:
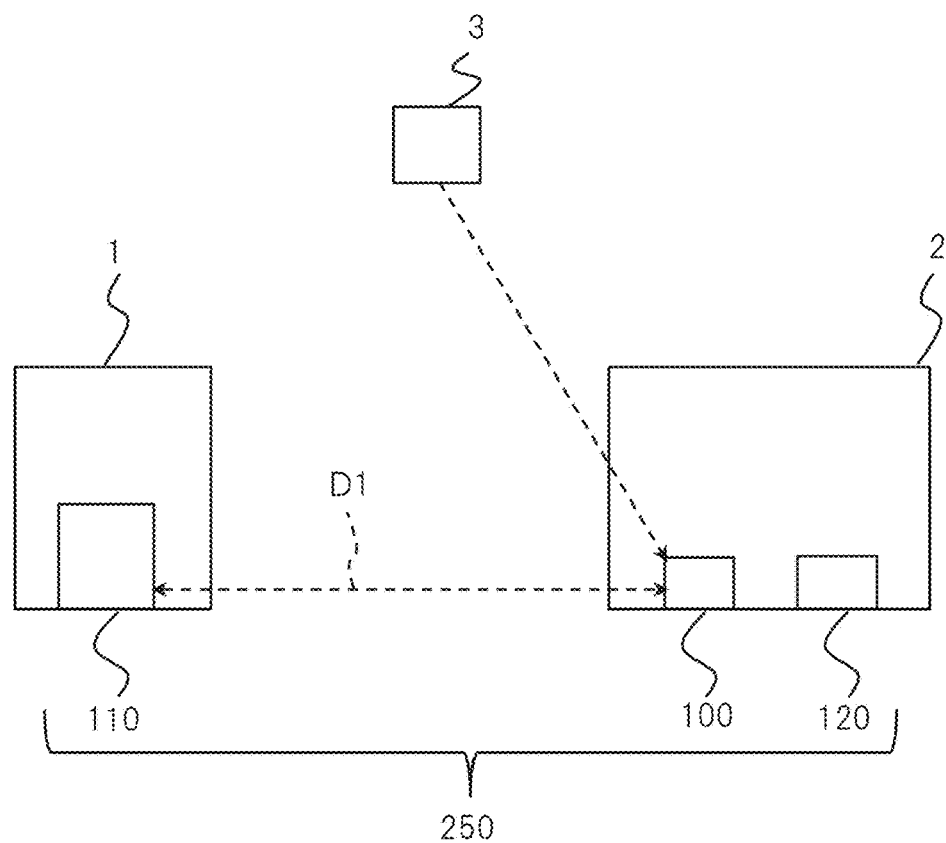
FIG. 7 is a diagram illustrating an example of a use mode of the information processing system according to the embodiment.

FIG. 7 is a diagram illustrating an example of a use mode of the information processing system 250 according to the embodiment. The example illustrated in FIG. 7 represents a case where the user is teleworking at home 2 away from the office 1 of the company where the user usually works.

For example, the information processing system 250 includes the information processing apparatus 100, the first image-forming apparatus 110, and the second image-forming apparatus 120. Note that the second image-forming apparatus 120 may be omitted in the information processing system 250.

It is assumed that the information processing apparatus 100 is used at home 2 which is located at a distance D1 from the first image-forming apparatus 110 installed in the office 1. For example, the information processing apparatus 100 is connected to a network in the company (that is, the first image-forming apparatus 110) through a VPN (Virtual Private Network). Furthermore, the second image-forming apparatus 120 (refer to FIG. 1) is installed in the home 2. The second image-forming apparatus 120 is connected to the same network as that connected by the information processing apparatus 100 in the home 2.

Since the information processing apparatus 100 includes the communicator 50 having the GPS antenna and the GPS receiver circuit as described above (refer to FIG. 2), the processor 10 (refer to FIG. 2) can acquire positional information, from GPS 3, indicating a current position of the information processing apparatus 100.

In addition, as described above, the information processing apparatus 100 has the storage 30 (refer to FIG. 2) storing the registration information 34 (refer to FIGS. 2 and 3). In the registration information 34, an installation location where the first image-forming apparatus 110 is installed is registered.

Accordingly, the distance determination processor 12 (refer to FIG. 2) of the information processing apparatus 100 can measure the distance D1 from the first image-forming apparatus 110 installed in the office 1 to the current position of the information processing apparatus 100.

Figure 8:
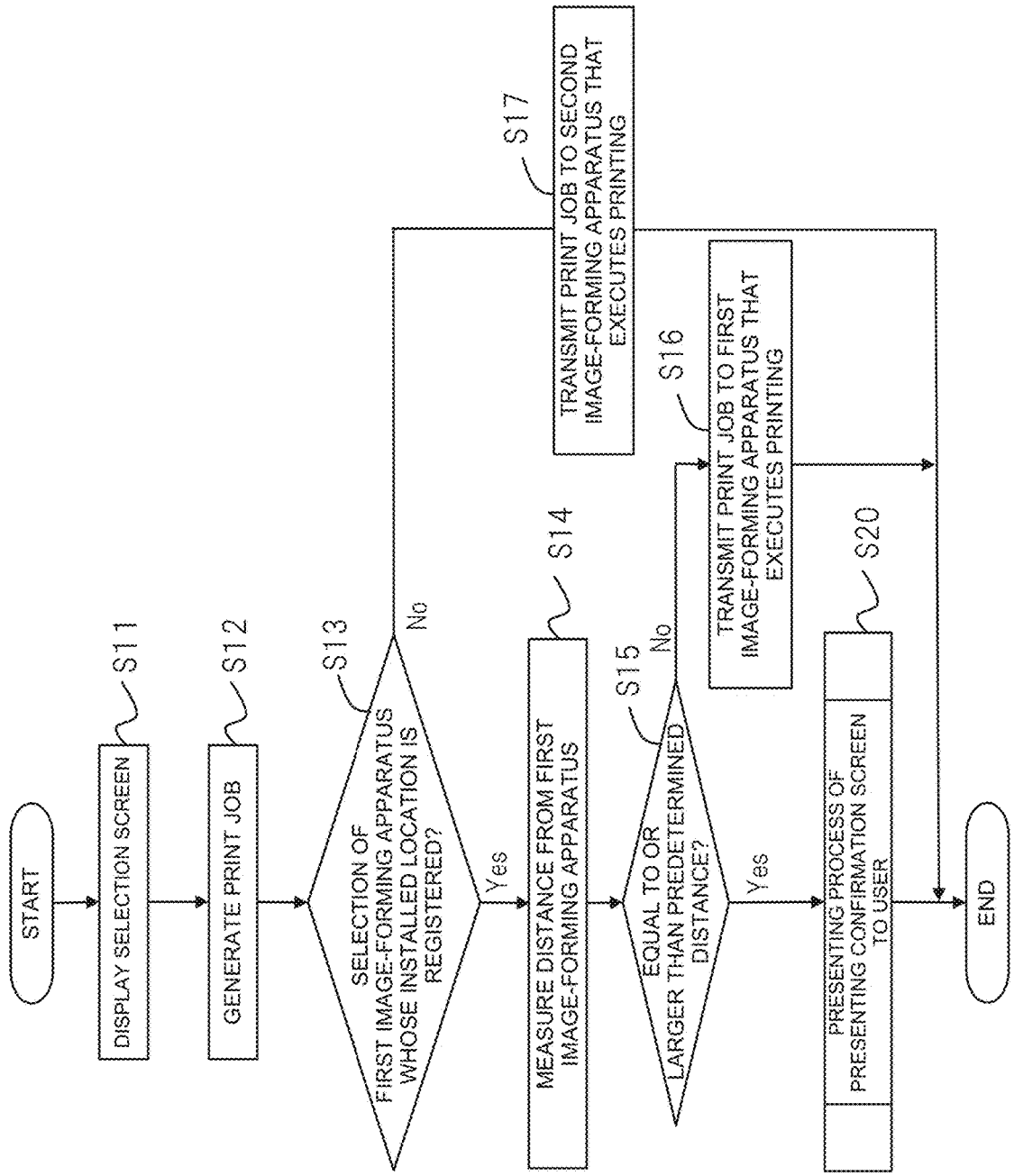
FIG. 8 is a flowchart of a process performed by the information processing apparatus according to the embodiment.

Next, an example of the process of the information processing apparatus 100 will be described with reference to FIG. 8 and the other drawings. FIG. 8 is a flowchart of a process performed by the information processing apparatus 100 according to the embodiment. Each of steps described below is executed by the processor 10 of the information processing apparatus 100.

For example, as illustrated in FIG. 7, while the user is teleworking at home 2, the user inputs a print instruction for executing printing to the information processing apparatus 100. Then, first, in step S11, the presentation determination processor 13 activates the image-forming program 31 based on the input indicating a printing instruction performed by the user, and displays the selection screen 310 (refer to FIG. 4) on the display 60 to present the selection screen 310 to the user. The presentation determination processor 13 may display the property setting screen 350 on the display 60 in response to the user's instruction so as to present the property setting screen 350 to the user. Then, the processor 10 acquires various input information from the user input via the print setting screens 300 including the selection screen 310 and the property setting screen 350.

Thereafter, in step S12, the print job generation processor 11 generates a print job 400 (refer to FIG. 6) for generating a printed matter by printing using the first image-forming apparatus 110 which is an image-forming apparatus selected on the selection screen 310. The print job generation processor 11 generates the print job 400 based on the first printer driver 32 by executing the image-forming program 31. Note that it is assumed herein that data indicating that print hold is not to be performed is stored in the document filing information 405 of the print job 400.

Next, in step S13, the presentation determination processor 13 determines whether the first image-forming apparatus 110 which is an image-forming apparatus whose installation location is registered in the registration information 34 has been selected on the selection screen 310.

When the presentation determination processor 13 determines that the image-forming apparatus selected on the selection screen 310 is the second image-forming apparatus 120 whose installation location has not been registered in the registration information 34, for example, in step S13 (No in step S13), the processor 10 transmits the print job 400 generated by the print job generation processor 11 to the second image-forming apparatus 120 via the communicator 50 in step S17. Accordingly, the processor 10 causes the second image-forming apparatus 120 that received the print job 400 to execute generation of a printed matter by printing.

When the presentation determination processor 13 determines that the image-forming apparatus selected on the selection screen 310 is the first image-forming apparatus 110 whose installation location has been registered in the registration information 34 in step S13 (Yes in step S13), the distance determination processor 12 measures the distance D1 from the first image-forming apparatus 110 to the information processing apparatus 100 based on a position of the first image-forming apparatus 110 and a current position of the information processing apparatus 100 in step S14. The distance determination processor 12 obtains the position of the first image-forming apparatus 110 based on the information registered in the registration information 34 and the current position of the information processing apparatus 100 based on the positional information obtained from GPS 3 (refer to FIG. 7).

Then, in step S15, the distance determination processor 12 determines whether the distance D1 measured in step S14 is equal to or larger than a predetermined distance set in advance.

Here, the predetermined distance is a reference value for the distance determination processor 12 to determine whether the information processing apparatus 100 is being used inside or outside the office 1 of the company. The predetermined distance is stored beforehand by the user or the like in the storage 30 or the like of the information processing apparatus 100. The predetermined distance may be arbitrarily set by the user, and may be set to 1 km, for example.

When the distance determination processor 12 determines in step S15 that the measured distance D1 is not equal to or larger than the predetermined distance (No in step S15), that is, when the distance determination processor 12 determines that the information processing apparatus 100 is used in the office 1 of the company, the processor 10 transmits the print job 400 generated by the print job generation processor 11 to the first image-forming apparatus 110 through the communicator 50 in step S16. By this, the processor 10 causes the first image-forming apparatus 110 that received the print job 400 to execute printing.

Furthermore, when the distance determination processor 12 determines in step S15 that the measured distance D1 is equal to or larger than the predetermined distance (Yes in step S15), that is, when the distance determination processor 12 determines that the information processing apparatus 100 is being used outside the office 1 of the company, the presentation determination processor 13 displays the confirmation screen (confirmation information) 500 for determining whether the image-forming apparatus for executing printing is to be switched from the first image-forming apparatus 110 (refer to FIGS. 9 and 10) on the display 60 to present the confirmation screen 500 to the user in step S20.

Although details will be described below, as the confirmation screen 500, at least one of the switching confirmation screen (switching confirmation information) 510 (refer to FIG. 9) and the printing method switching confirmation screen 550 (refer to FIG. 10) is taken as an example. The switching confirmation screen 510 (refer to FIG. 9) is a screen (information) used to confirm whether to switch an image-forming apparatus for executing printing from the first image-forming apparatus 110 to the second image-forming apparatus 120.

The printing method switching confirmation screen 550 (refer to FIG. 10) represents at least one confirmation information item for confirming whether a printing method is to be switched. Examples of the information for confirming whether a printing method is to be switched include the print hold confirmation information 551 that confirms whether to perform print hold in which immediate printing in the first image-forming apparatus 110 is to be suspended, the request printing confirmation information 552 that confirms whether to request printing to a person other than the user, the network printing confirmation information 553 that confirms whether to perform network printing in which printing of file data registered in a server is executed by a third image-forming apparatus (which will be described below with reference to FIG. 12), and the calendar registration confirmation information 554 that confirms whether the scheduled printing date is to be registered in the calendar.

It is assumed here that the user uses the information processing apparatus 100, which is usually used in the office 1 of the company where the user usually works, in the home 2 during telework to perform the work. Then, when the user inputs an instruction indicating execution of printing to the information processing apparatus 100, the user may mistakenly select the first image-forming apparatus 110, which is selected by default on the selection screen 310, instead of the second image-forming apparatus 120 installed in the home 2, and furthermore, input an instruction for executing printing in the first image-forming apparatus 110 installed far away from the user without performing the print hold.

Here, the information processing apparatus 100 of this embodiment includes the presentation determination processor 13 and the distance determination processor 12. Then, the presentation determination processor 13 presents the selection screen (selection information) 310 to allow the user to select an image-forming apparatus (the first image-forming apparatus 110 or the second image-forming apparatus 120) for executing printing (step S11 in FIG. 8), and the distance determination processor 12 measures, when the first image-forming apparatus 110 in which the installation position is registered in advance is selected on the selection screen 310 (Yes in step S13), the distance D1 from the installation position of the first image-forming apparatus 110 to the information processing apparatus 100 (step S14) and determines whether the measured distance D1 is equal to or larger than the predetermined distance (step S15). Furthermore, the presentation determination processor 13 performs, when the distance determination processor 12 determines that the distance D1 is equal to or larger than the predetermined distance (Yes in step S15), a presenting process of presenting, to the user, the confirmation screen (confirmation information) 500 for confirming whether the image-forming apparatus for executing printing is to be switched from the first image-forming apparatus 110 (step S20).

As a result, when an image-forming apparatus (e.g., the first image-forming apparatus 110) that is located equal to or more than the predetermined distance away is selected from among the plurality of image-forming apparatuses corresponding to printer drivers installed in the information processing apparatus 100, the presentation determination processor 13 presents the confirmation screen 500 so that the user may check whether an undesired image-forming apparatus (for example, the first image-forming apparatus 110) has been selected. Accordingly, accidental printing by an image-forming apparatus that is located far away from the information processing apparatus 100 being used by the user (for example, the first image-forming apparatus 110), that is, printing by an image-forming apparatus that is not intended by the user can be avoided. Consequently, unrequired printing can be avoided. Furthermore, information leakage caused by a printed matter mistakenly printed and being left unattended or by a printed matter acquired by a person different from the user may be avoided.

Next, the confirmation screen 500 and the presenting process performed in step S20 will be described in detail with reference to FIGS. 9 to 15.

Figure 9:
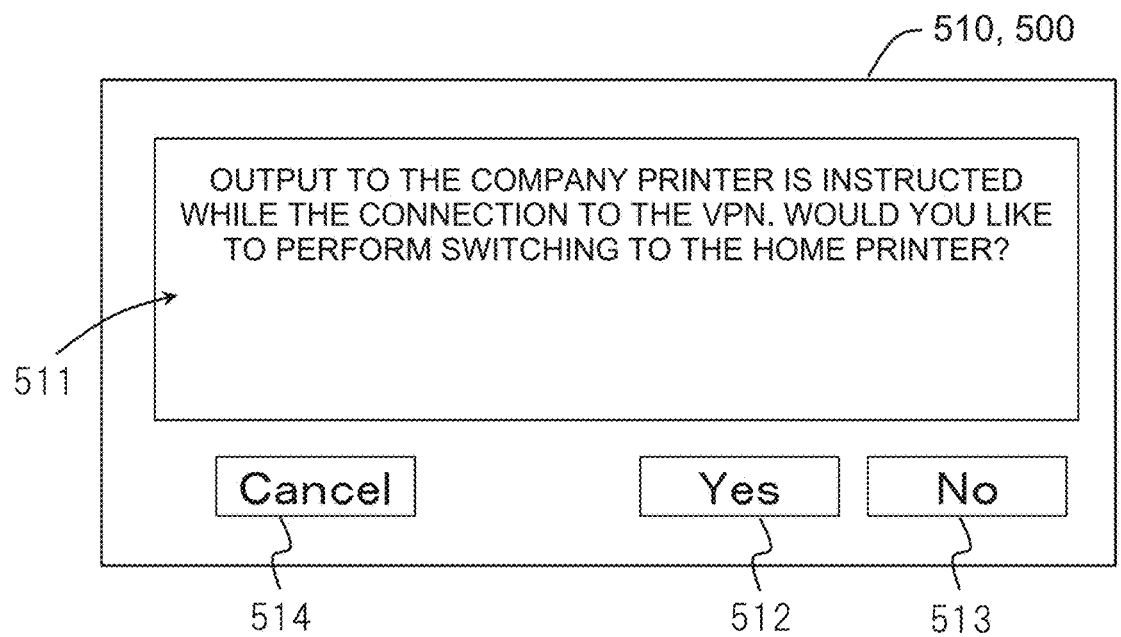
FIG. 9 is a diagram illustrating an example of a switching confirmation screen presented by the presentation determination processor according to the embodiment.

FIG. 9 is a diagram illustrating an example of a switching confirmation screen (switching confirmation information) 510 presented by the presentation determination processor 13 according to the embodiment. The confirmation screen 500 may include the switching confirmation screen 510. The switching confirmation screen 510 is an example of the confirmation screen 500 that is presented by the presentation determination processor 13 in the presenting process in step S20. The confirmation screen 500 is, for example, a UI screen.

When the distance determination processor 12 determines that the distance D1 is equal to or larger than the distance D1 (Yes in step S15), the presentation determination processor 13 displays the switching confirmation screen 510 (refer to FIG. 9) on the display 60 so as to present the switching confirmation screen 510 to the user. Note that, when the distance determination processor 12 determines that the distance D1 is equal to or larger than the distance D1 (Yes in step S15), the presentation determination processor 13 may display the printing method switching confirmation screen 550 described hereinafter with reference to FIG. 10 on the display 60 instead of the switching confirmation screen 510 (refer to FIG. 9) so as to present the printing method switching confirmation screen 550 to the user.

The switching confirmation screen 510 includes, for example, a switching confirmation region 511, a Yes button 512, a No button 513, and a cancel button 514.

The switching confirmation region 511 includes information indicating whether the image-forming apparatus for executing printing is to be switched from the first image-forming apparatus 110 selected on the selection screen 310 (refer to FIG. 4) to the second image-forming apparatus 120. In the example in FIG. 9, the switching confirmation region 511 includes a message, presented to the user, "Output to the company printer is instructed while the connection to the VPN. Would you like to perform switching to the home printer?" so as to confirm whether the image-forming apparatus for executing printing is to be switched from the first image-forming apparatus 110 to the second image-forming apparatus 120.

In this way, the presentation determination processor 13 displays, on the display 60, the switching confirmation screen 510 for confirming whether an image-forming apparatus for executing printing selected on the selection screen 310 (refer to FIG. 4) is to be switched from the first image-forming apparatus 110 to the second image-forming apparatus 120 that is different from the first image-forming apparatus 110 so as to present the switching confirmation screen 510 to the user.

As a result, the user may visually confirm through the switching confirmation screen 510 whether an image-forming apparatus (for example, the first image-forming apparatus 110) that is not for executing printing is selected from among a plurality of image-forming apparatuses corresponding to printer drivers installed in the information processing apparatus 100. Accordingly, accidental printing performed by an image-forming apparatus that is far away from the information processing apparatus 100 being used by the user (for example, the first image-forming apparatus 110) can be avoided.

Then, when the user selects the Yes button 512 in the switching confirmation screen 510, the presentation determination processor 13 switches the image-forming apparatus for executing printing from the first image-forming apparatus 110 to the second image-forming apparatus 120. Then, the presentation determination processor 13 transmits the print job 400 generated by the print job generation processor 11 to the second image-forming apparatus 120 connected to the same network as the information processing apparatus 100 (connected to the same router 200 as the information processing apparatus 100, for example), instead of the first image-forming apparatus 110 selected on the selection screen 310 (refer to FIG. 4), through the communicator 50. Accordingly, printing may be executed by the second image-forming apparatus 120 originally intended by the user to perform printing. Therefore, unrequired printing may be avoided and a highly convenient information processing apparatus 100 for users may be attained.

Furthermore, when the information processing apparatus 100 is connected, as a network connection, to the office of the company, that is, the first image-forming apparatus 110, through the VPN, and the image-forming apparatus for executing printing has been switched from the first image-forming apparatus 110 to the second image-forming apparatus 120, the presentation determination processor 13 may disconnect the VPN between the information processing apparatus 100 and the office of the company, that is, the first image-forming apparatus 110. In this way, by disconnecting the VPN between the information processing apparatus 100 and the first image-forming apparatus 110, a load on the memory of the information processing apparatus 100 may be reduced, and in addition, when a band of the VPN is shared with a plurality of other users, a load on the band of the shared VPN may be reduced.

When the user selects the No button 513 in the switching confirmation screen 510, the presentation determination processor 13 displays the printing method switching confirmation screen (printing method switching confirmation information) 550, which will be described hereinafter with reference to FIG. 10, on the display 60 without switching the image-forming apparatus for executing printing from the first image-forming apparatus 110 so as to present the printing method switching confirmation screen 550 to the user. Thereafter, the user selects any one of the selection items displayed on the printing method switching confirmation screen 550 so that execution of printing that is not intended by the user can be avoided.

When the user selects the No button 513 in the switching confirmation screen 510, the presentation determination processor 13 may transmit the print job 400 to the first image-forming apparatus 110 through the communicator 50 so that the first image-forming apparatus 110 executes printing based on the print job 400. In this case also, since the presentation determination processor 13 presents the switching confirmation screen 510, the user can again recognize that the image-forming apparatus for executing printing that is originally intended by the user is definitely the first image-forming apparatus 110. Accordingly, execution of printing unintended by the user is avoided and printing performed by the first image-forming apparatus 110 intended by the user is enabled, and therefore, the information processing apparatus 100 that is highly convenient for the user may be attained. Note that, in this case, a notification requesting a predetermined user to acquire a printed matter on behalf of the user may be transmitted from the communicator 50 of the information processing apparatus 100 to the first image-forming apparatus 110, for example. In this way, information leakage caused by a printed matter being left unattended or a printed matter being acquired by a person who is not intended by the user may be avoided.

When the cancel button 514 is selected by the user in the switching confirmation screen 510, the processor 10 cancels execution of printing.

Figure 10:
FIG. 10 is a diagram illustrating an example of a printing method switching confirmation screen presented by the presentation determination processor according to the embodiment.

FIG. 10 is a diagram illustrating an example of the printing method switching confirmation screen (printing method switching confirmation information) 550 presented in the presenting process (step S20) performed by the presentation determination processor 13 according to the embodiment. The confirmation screen 500 may include the printing method switching confirmation screen 550. The printing method switching confirmation screen 550 is an example of the confirmation screen 500 that is presented by the presentation determination processor 13 in the presenting process in step S20.

When the user selects the No button 513 in the switching confirmation screen 510 (refer to FIG. 9), the presentation determination processor 13 displays the printing method switching confirmation screen 550 on the display 60 so as to present the printing method switching confirmation screen 550 to the user. Note that, when the distance determination processor 12 determines that the distance D1 is equal to or larger than the predetermined distance (Yes in step S15), the presentation determination processor 13 may display the printing method switching confirmation screen 550 on the display 60, instead of the switching confirmation screen 510 (refer to FIG. 9), so as to present the printing method switching confirmation screen 550 to the user.

The printing method switching confirmation screen 550 includes at least one information item for confirming whether a printing method is to be switched. For example, the printing method switching confirmation screen 550 includes at least one of print hold confirmation information 551 to confirm whether to perform print hold, request printing confirmation information 552 to confirm whether to perform request printing, network printing confirmation information 553 to confirm whether to perform network printing, and calendar registration confirmation information 554 to confirm whether to perform calendar registration. The printing method switching confirmation screen 550 includes, for example, an OK button 555 and a cancel button 556.

In the example illustrated in FIG. 10, in the printing method switching confirmation screen 550, the user confirms and selects a printing method from among the print hold, the request printing, the network printing, and the calendar registration.

The print hold confirmation information 551, for example, presents confirmation of whether to perform the print hold to the user. For example, in the example illustrated in FIG. 10, the print hold confirmation information 551 includes text "Print Hold" and a selection box adjacent to the text "Print Hold". When the print hold confirmation information 551 is selected, for example, by inputting a check in the selection box and the OK button 555 is selected, the presentation determination processor 13 executes a process for performing the print hold.

The request printing is a process of requesting printing to another person who is different from the user of the information processing apparatus 100. Examples of another person who is different from the user include an employee who is working in the office 1 of the company while the user is working at home 2.

The request printing confirmation information 552, for example, presents confirmation of whether to perform the request printing to the user. In the example illustrated in FIG. 10, the request printing confirmation information 552 includes text "Request Printing" and a selection box adjacent to the text "Request Printing". When the request printing confirmation information 552 is selected, for example, by inputting a check in the selection box and the OK button 555 is selected, the presentation determination processor 13 executes a process for performing the request printing (which will be described with reference to FIG. 11).

Network printing means that the information processing apparatus 100 registers file data to be printed to a server connected as a network to a third image-forming apparatus that is different from the first and second image-forming apparatuses and that corresponds to a printer driver not installed in the information processing apparatus 100, and the third image-forming apparatus that accepts an input operation performed by the user reads the file data from the server connected through the network and executes printing based on the read file data.

The network printing confirmation information 553, for example, presents confirmation of whether to perform the network printing to the user. In the example illustrated in FIG. 10, the network printing confirmation information 553 includes text "Network Printing" and a selection box adjacent to the text "Network Printing". When the network printing confirmation information 553 is selected, for example, by inputting a check in the selection box and the OK button 555 is selected, the presentation determination processor 13 executes a process for performing the network printing (which will be described hereinafter with reference to FIG. 12).

The calendar registration means that the user registers a scheduled date when the first image-forming apparatus 110 performs printing to a calendar application.

The calendar registration confirmation information 554, for example, presents confirmation of whether to perform the calendar registration to the user. In the example illustrated in FIG. 10, the calendar registration confirmation information 554 includes text "Calendar Registration" and a selection box adjacent to the text "Calendar Registration". When the calendar registration confirmation information 554 is selected, for example, by inputting a check in the selection box and the OK button 555 is selected, the presentation determination processor 13 executes a process for performing the calendar registration (which will be described hereinafter with reference to FIG. 13).

Note that, when the cancel button 556 is selected, the processor 10 cancels the switching of the printing method, and the presentation determination processor 13 closes the printing method switching confirmation screen 550. Hereinafter, processes input through the printing method switching confirmation screen 550 will be described below.

As illustrated in FIG. 10, for example, when the print hold confirmation information 551 is selected and the OK button 555 is selected, the print job generation processor 11 stores data indicating that the print hold is to be performed in the print job 400 as a process for performing the print hold. Specifically, the print job generation processor 11 rewrites data indicating that printing is to be immediately performed, which is stored in the document filing information 405 (refer to FIG. 6) included in the print job 400, to data indicating the print hold.

Thus, when the data indicating that printing is to be immediately performed is stored in the document filing information 405 (refer to FIG. 6), the print job generation processor 11 stores the data indicating that the print hold is to be performed in the print job 400.

As a result, the document filing information 405 (refer to FIG. 6) in the print job 400 stores the data indicating the print hold in which printing is suspended in the first image-forming apparatus 110 to which the print job 400 is transmitted irrespective of the selection items 361 and 362 selected in the document filing setting field 360 in the property setting screen 350 (refer to FIG. 5).

In this way, when the document filing information 405 (refer to FIG. 6) of the print job 400 stores the data indicating that printing is to be immediately performed, the print job generation processor 11 switches the printing method for printing performed by the first image-forming apparatus 110 from immediate execution of printing to pending of printing.

Then, the communicator 50 transmits, to the first image-forming apparatus 110, the print job 400 in which the printing method has been switched and to which the information on suspending of generation of a printed matter has been added so as to cause the first image-forming apparatus 110 to store the print job 400 and suspend execution of printing based on the print job 400.

Therefore, when the user comes to the office 1 of the company at a later date, for example, the first image-forming apparatus 110 can execute, in response to an input operation performed by the user, printing based on the print job 400 stored in the storage of the first image-forming apparatus 110. Accordingly, unrequired printing that is not intended by the user may be avoided, and the user may immediately obtain a printed matter.

When the print hold confirmation information 551 is selected and the OK button 555 is selected, the presentation determination processor 13 may display a screen for confirming whether to input a password on the display 60 after presenting the printing method switching confirmation screen 550, so as to present the screen to the user. When the user inputs a password, the print job generation processor 11 stores the input password as data in the password information 406 of the print job 400. Accordingly, content of the print job 400 that is stored in the storage of the first image-forming apparatus 110 and that is subjected to the print hold is not viewed by others.

Figure 11:
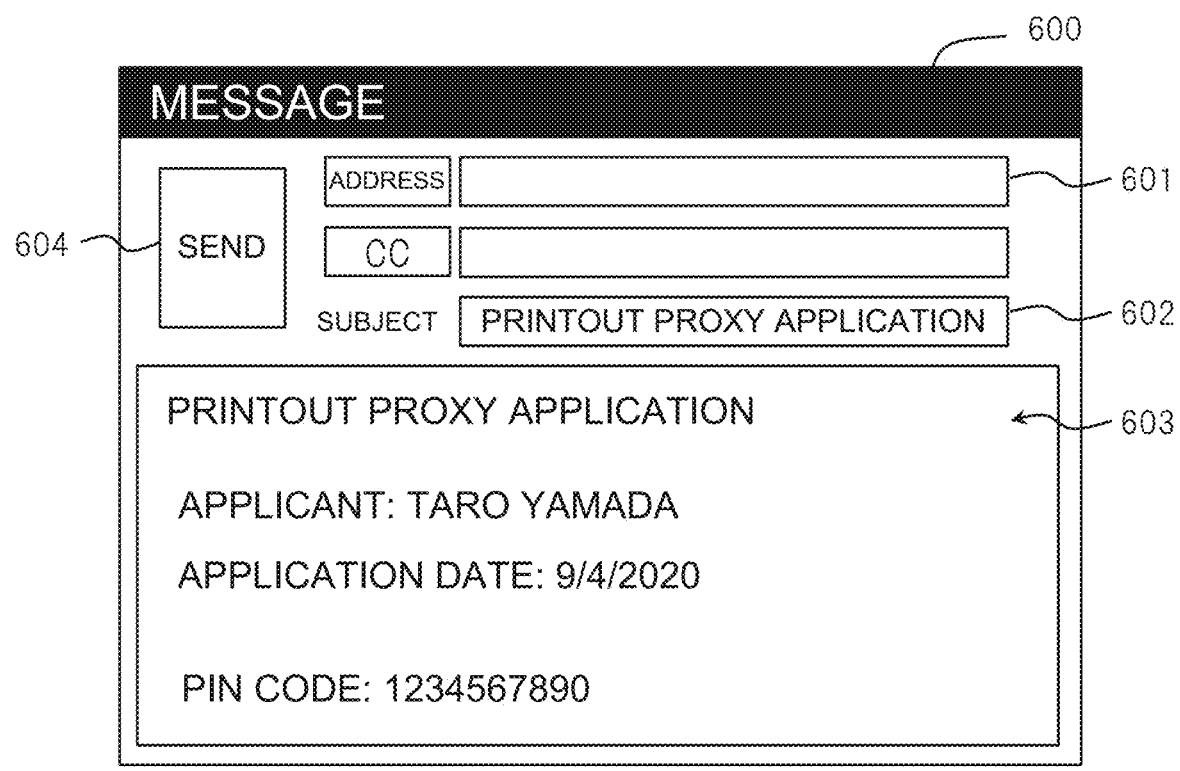
FIG. 11 is a diagram illustrating an example of a message fill-in screen of an e-mail application for performing request printing according to the embodiment.

FIG. 11 is a diagram illustrating an example of a message fill-in screen 600 of an e-mail application for performing request printing according to the embodiment.

When the request printing confirmation information 552 is selected and the OK button 555 is selected on the printing method switching confirmation screen 550 (refer to FIG. 10), for example, the presentation determination processor 13 executes a process for requesting printing to another person.

As the process for performing request printing performed by the presentation determination processor 13, for example, the e-mail application is activated and the message fill-in screen (registration screen) 600 of the e-mail application is displayed on the display 60 so as to present the message fill-in screen 600 to the user. The message fill-in screen 600 of the e-mail application is an example of a registration screen for requesting printing to another person presented by the presentation determination processor 13.

For example, the message fill-in screen 600 includes an e-mail address field 601 for a transmission destination of an e-mail that is a destination of a print request, a subject field 602, a message field 603, and a sending button 604 for sending the e-mail.

When the user inputs required information in the e-mail address field 601, the subject field 602, and the message field 603 and selects the sending button 604, the presentation determination processor 13 causes the communicator 50 to send an e-mail including the input information to the e-mail address specified by the user. In this way, printing may be requested to a print request destination, such as an employee working in the office 1 of the company, for example.

Note that the presentation determination processor 13 may insert text including content of the request for printing, such as "Printout proxy application," in the subject field 602 in a standard form and display the message fill-in screen 600 on the display 60. In addition, the presentation determination processor 13 may insert, for example, a user name (applicant) who requests printing, a date of application, and a PIN code which is a password added to the print job 400, into the message field 603 when displaying the message fill-in screen 600 on the display 60.

In this way, when the request printing is selected, the presentation determination processor 13 presents the message fill-in screen (registration screen) 600 for requesting printing to another person. Therefore, the user may request printing to another person by inputting the required information on the presented message fill-in screen (registration screen) 600. Accordingly, execution of printing unintended by the user may be avoided and a printed matter may be obtained by another person who is requested to perform printing instead of the user.

The registration screen for requesting printing to another person which is presented by the presentation determination processor 13 is not limited to the message fill-in screen 600 of the e-mail application, and may be a message fill-in screen of an application capable of transmitting other messages.

Figure 12:
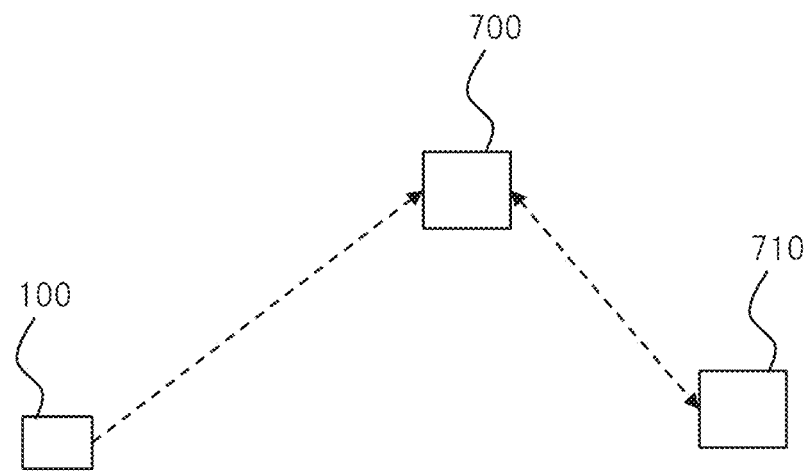
FIG. 12 is a diagram illustrating a state in which network printing is performed according to the embodiment.

FIG. 12 is a diagram illustrating a state in which network printing is performed according to the embodiment. Network printing means that file data registered in a server 700 is printed by a third image-forming apparatus 710. To perform the network printing, first, the communicator 50 of the information processing apparatus 100 transmits file data of a file intended by the user to print, based on an input operation performed by the user, to the server 700 connected through a network to the third image-forming apparatus 710 installed in a convenience store or the like near the user's home 2. By this, the communicator 50 registers the file data of the file intended by the user to print in the server 700. Note that the third image-forming apparatus 710 is different from the first image-forming apparatus 110 or the second image-forming apparatus 120 in that a printer driver thereof is not installed in the information processing apparatus 100.

Thereafter, in response to an input operation performed by the user, the third image-forming apparatus 710 downloads the file data registered by the user from the server 700 and executes printing based on the file data. Accordingly, unrequired printing that is not intended by the user may be avoided, and the user may immediately obtain a printed matter.

Figure 13:
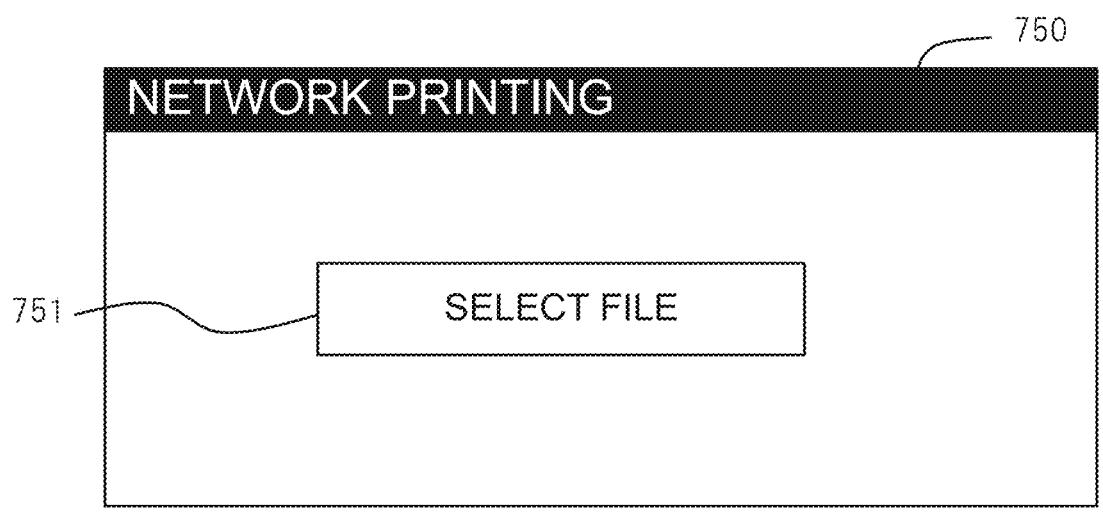
FIG. 13 is a diagram illustrating an example of a registration screen used to perform the network printing according to the embodiment.

FIG. 13 is a diagram illustrating an example of a registration screen 750 used to perform the network printing according to the embodiment.

When the network printing confirmation information 553 is selected and the OK button 555 is selected on the printing method switching confirmation screen 550 (refer to FIG. 10), for example, the presentation determination processor 13 executes a process of performing the network printing.

As the process for performing the network printing performed by the presentation determination processor 13, for example, the presentation determination processor 13 displays a registration screen 750 for registering (that is, uploading) file data to be subjected to the network printing to the server 700 on the display 60 so as to present the registration screen 750 to the user. The registration screen 750 is an example of a registration screen for performing the network printing.

The registration screen 750 includes a button 751 for selecting file data. When the user selects the file data selection button 751, the presentation determination processor 13 displays a screen for selecting file data on the display 60. Thereafter, when file data to be printed is selected by the user, the communicator 50 transmits the selected file data to the server 700. Accordingly, the file data is registered in the server 700 connected through the network to the third image-forming apparatus 710.

Thereafter, in response to an input operation performed by the user, the third image-forming apparatus 710 downloads the file data registered in the server 700 and executes printing. Accordingly, unrequired printing that is not intended by the user may be avoided, and the user may immediately obtain a printed matter.

As for the process for performing the network printing by the presentation determination processor 13, for example, the presentation determination processor 13 may display a screen of an application for executing an SNS (Social Networking Service) function, such as LINE (registered trademark), on the display 60 to present the screen to the user and execute the process for performing the network printing through the application for executing the SNS function.

Figure 14:
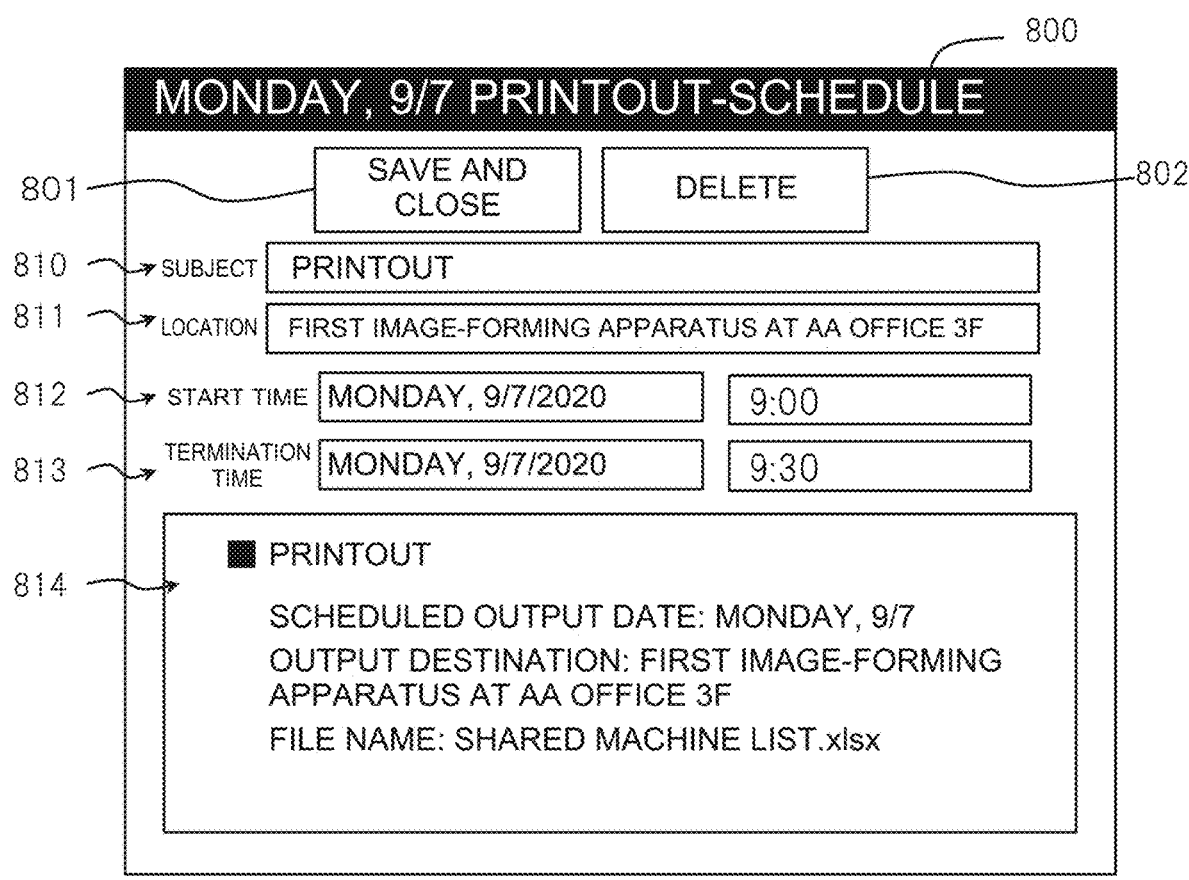
FIG. 14 is a diagram illustrating an example of a calendar registration screen used to perform calendar registration according to the embodiment.

FIG. 14 is a diagram illustrating an example of a schedule registration screen 800 used to perform calendar registration according to the embodiment.

When the calendar registration confirmation information 554 is selected and the OK button 555 is selected on the printing method switching confirmation screen 550 (refer to FIG. 10), for example, the presentation determination processor 13 executes a process for performing calendar registration.

As the process for performing the calendar registration by the presentation determination processor 13, for example, the presentation determination processor 13 activates a calendar application and displays the schedule registration screen (registration screen) 800 for registering a scheduled printing date on the display 60 so as to present the schedule registration screen 800 to the user. The schedule registration screen 800 of the calendar application is an example of a registration screen that is presented by the presentation determination processor 13 and in which a scheduled printing date is registered.

For example, the schedule registration screen 800 includes a save button 801 to save the registered scheduled printing date, a deletion button 802 to delete schedule registered through the schedule registration screen 800, and a subject input field 810 to input a schedule name, a location input field 811 to input a location where content described in the schedule is to be executed, a start time field 812 to input a schedule start date and time, a termination time field 813 to input a schedule termination date and time, and a content fill-in field 814 to input content of the schedule.

When the user inputs information required for registration of a scheduled printing date to the subject input field 810, the location input field 811, the start time field 812, the termination time field 813, and the content fill-in field 814 and selects the save button 801, the presentation determination processor 13 registers the scheduled printing date (calendar registration) which is a date and time specified by the user in the calendar application.

In this way, since the presentation determination processor 13 causes the user to register the scheduled printing date when the first image-forming apparatus 110 executes printing in the calendar application, the user may perform printing as planned, and accordingly, printing unintended by the user may be avoided.

Figure 15:
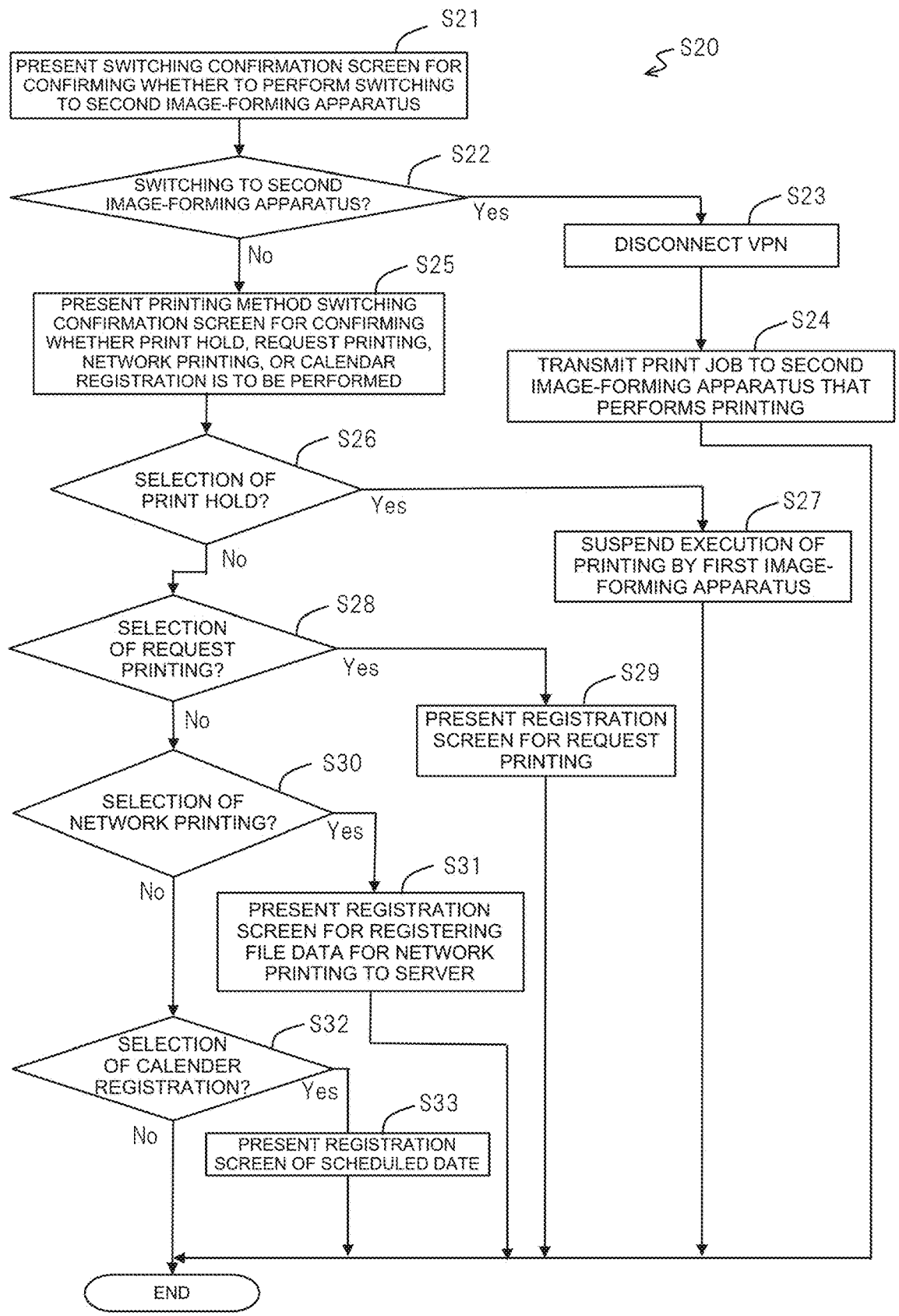
FIG. 15 is a flowchart of a flow of a presenting process according to the embodiment.

FIG. 15 is a flowchart of a flow of the presenting process in step S20 according to the embodiment. First, in step S15 in FIG. 8, the distance determination processor 12 determines that the distance D1 from the first image-forming apparatus 110 to the information processing apparatus 100 is equal to or larger than the predetermined distance set in advance.

Thereafter, in step S21, the presentation determination processor 13 displays, on the display 60, the switching confirmation screen 510 for confirming whether an image-forming apparatus used for executing printing selected on the selection screen 310 (refer to FIG. 4) is to be switched from the first image-forming apparatus 110 to the second image-forming apparatus 120 that is different from the first image-forming apparatus 110 so as to present the switching confirmation screen 510 to the user.

In step S22, the presentation determination processor 13 determines whether the image-processing apparatus for performing printing has been switched from the first image-forming apparatus 110 to the second image-forming apparatus 120 through the switching confirmation screen 510.

When the image-forming apparatus for performing printing has been switched from the first image-forming apparatus 110 to the second image-forming apparatus 120 via the switching confirmation screen 510 in step S22 (Yes in step S22), the presentation determination processor 13 causes the communicator 50 to disconnect the VPN when the information processing apparatus 100 is connected to the office 1 of the company through the VPN as a network connection in step S23.

In step S24, the presentation determination processor 13 transmits, via the communicator 50, the print job 400 to the switched second image-forming apparatus 120. Then, the presentation determination processor 13 causes the second image-forming apparatus 120 to execute printing based on the print job 400.

On the other hand, when the image-forming apparatus for performing printing is not switched from the first image-forming apparatus 110 to the second image-forming apparatus 120 via the switching confirmation screen 510 in step S22 (No in step S22), the presentation determination processor 13 displays the printing method switching confirmation screen 550 used to confirm whether the print hold, the request printing, the network printing, or the calendar registration is to be executed on the display 60 so as to present the printing method switching confirmation screen 550 to the user in step S25.

Then, in step S26, the presentation determination processor 13 determines whether the print hold has been selected via the printing method switching confirmation screen 550. In step S26, when the print hold is selected via the printing method switching confirmation screen 550 (Yes in step S26), the presentation determination processor 13 executes the process for performing the print hold in step S27. In other words, the presentation determination processor 13 causes the print job generation processor 11 to store data indicating that the print hold is to be performed in the print job 400. Then, the presentation determination processor 13 causes the communicator 50 to transmit the print job 400 to the first image-forming apparatus 110. Accordingly, the presentation determination processor 13 transmits the print job 400 to the first image-forming apparatus 110 through the communicator 50 so that printing to be performed by the first image-forming apparatus 110 based on the print job 400 is suspended.

Furthermore, when the print hold is not selected through the printing method switching confirmation screen 550 (No in step S26), the presentation determination processor 13 determines whether the request printing has been selected through the printing method switching confirmation screen 550 in step S28.

When the request printing is selected via the printing method switching confirmation screen 550 in step S28 (Yes in step S28), the presentation determination processor 13 executes the process for performing the request printing in step S29. Specifically, the presentation determination processor 13 displays a registration screen for performing the request printing, such as the message fill-in screen 600 of the e-mail application on the display 60 to present the registration screen to the user. Then, based on an input operation performed by the user, the presentation determination processor 13 requests printing to a destination of the request for printing based on the input registration screen.

Furthermore, when the request printing is not selected through the printing method switching confirmation screen 550 in step S28 (No in step S28), the presentation determination processor 13 determines whether the network printing has been selected through the printing method switching confirmation screen 550 in step S30.

When the network printing is selected via the printing method switching confirmation screen 550 in step S30 (Yes in step S30), the presentation determination processor 13 executes the process for performing the network printing in step 31. Specifically, the presentation determination processor 13 displays a registration screen for performing the network printing, such as the registration screen 750, on the display 60 to present the registration screen 750 to the user. Thereafter, based on an input operation performed by the user, the presentation determination processor 13 uploads file data specified in the input registration screen to the server 700 via the communicator 50.

Furthermore, when the network printing is not selected through the printing method switching confirmation screen 550 in step S30 (No in step S30), the presentation determination processor 13 determines whether the calendar registration has been selected through the printing method switching confirmation screen 550 in step S32.

When the calendar registration is selected via the printing method switching confirmation screen 550 in step S32 (Yes in step S32), the presentation determination processor 13 executes the process for performing the calendar registration in step S33. Specifically, the presentation determination processor 13 displays a schedule registration screen of a calendar application for registering a scheduled printing date, such as a schedule registration screen 800, on the display 60 to present the schedule registration screen to the user. Thereafter, based on an input operation performed by the user, the presentation determination processor 13 registers the scheduled printing date in the calendar application.

When the calendar registration is not selected via the printing method switching confirmation screen 550 in step S32 (No in step S32), the presentation determination processor 13 closes the printing method switching confirmation screen 550 so as to terminate the presenting process in step S20. Note that examples of the case where the calendar registration is not selected through the printing method switching confirmation screen 550 in step S32 include a case where the user selects the cancel button 556.

The presenting process in step S20 described with reference to FIG. 15 is merely an example and may be modified where appropriate. For example, when the determination in step S15 (refer to FIG. 8) is affirmative, step S21 to step S24 may be omitted and the process may start with step S25. When the print hold is omitted among the confirmation items included in the printing method switching confirmation screen 550 presented by the presentation determination processor 13 in step S25, step S26 and step S27 may be omitted. In addition, when the request printing is omitted, step S28 and step S29 may be omitted. When the network printing is omitted, step S30 and step S31 may be omitted. When the calendar registration is omitted, step S32 and step S33 may be omitted.

Although the embodiment has been described in detail above, it will be easy for those skilled in the art to understand that many modifications may be made that do not substantively departing from the novelties and effects of the embodiment. Therefore, all such modifications are also included in the scope of the present disclosure. For example, a term that is mentioned at least once in the specification or the drawings along with a different term that is broader or synonymous may be replaced by the different term anywhere in the specification or the drawings. All combinations of this embodiment and modifications are also included in the scope of the present disclosure. The configurations and the operations of the user terminal, the imaging-forming apparatuses, and so on are not limited to those described in this embodiment, and various modifications may be made.

What is claimed is:

1. An information processing apparatus comprising:
a presentation determination processor that presents selection information for causing a user to select an image-forming apparatus for executing printing; and
a distance determination processor that measures, when a first image-forming apparatus is selected in the selection information, a distance of the first image-forming apparatus from an installation position and determines whether the measured distance is equal to or larger than a predetermined distance, wherein
when determining that the distance is equal to or larger than the predetermined distance, the presentation determination processor performs a presenting process of presenting confirmation information for confirming whether the image-forming apparatus for executing printing is to be switched from the first image-forming apparatus.

2. The information processing apparatus according to claim 1, wherein the confirmation information includes switching confirmation information for confirming whether to switch the image-forming apparatus for executing printing to a second image-forming apparatus different from the first image-forming apparatus.

3. The information processing apparatus according to claim 2, wherein the second image-forming apparatus is connected to the same network as the information processing apparatus.

4. The information processing apparatus according to claim 2, wherein
the information processing apparatus has network connection established with the first image forming apparatus through a VPN, and
when the image-forming apparatus for executing printing is switched from the first image-forming apparatus to the second image-forming apparatus, the presentation determination processor disconnects the VPN.

5. The information processing apparatus according to claim 1, further comprising:
a communicator that transmits a print job for executing the printing, wherein
the confirmation information includes print hold confirmation information for confirming whether to perform print hold, and
when the print hold confirmation information is selected, the communicator causes the first image-forming apparatus to suspend execution of the printing based on the print job by transmitting the print job to the first image-forming apparatus.

6. The information processing apparatus according to claim 1, wherein
the confirmation information includes request printing confirmation information for confirming whether to request printing to another person different from the user, and
when the request printing confirmation information is selected, the presentation determination processor presents a registration screen for performing the request printing.

7. The information processing apparatus according to claim 1, wherein
the confirmation information includes network printing confirmation information for confirming whether to perform network printing in which file data registered on a server is printed by a third image-forming apparatus, and
when the network printing confirmation information is selected, the presentation determination processor presents a registration screen for registering file data for network printing, to the server.

8. The information processing apparatus according to claim 1, wherein
the confirmation information includes calendar registration confirmation information for confirming whether to register a scheduled printing date to a calendar, and
when the calendar registration confirmation information is selected, the presentation determination processor activates a calendar application and presents a registration screen for registering the scheduled printing date.

9. An information processing system comprising:
the information processing apparatus according to claim 1; and
the first image-forming apparatus.

10. An information processing method, comprising:
presenting selection information for causing a user to select an image-forming apparatus for executing printing; and
measuring, when a first image-forming apparatus is selected in the selection information, a distance of the first image-forming apparatus from an installation position and determining whether the measured distance is equal to or larger than a predetermined distance, wherein
when it is determined that the distance is equal to or larger than the predetermined distance, presenting confirmation information for confirming whether the image-forming apparatus for executing printing is to be switched from the first image-forming apparatus.

* * * * *